United States Patent [19]

Rijckaert et al.

[11] Patent Number: 4,816,927
[45] Date of Patent: Mar. 28, 1989

[54] MAGNETIC-TAPE APPARATUS, HAVING MEANS FOR OPTIMIZING TAPE SPEED

[75] Inventors: Alvert M. A. Rijckaert; Joannes A. E. Van Der Kop, both of Eindhoven, Netherlands

[73] Assignee: U.S. Philips Corp., New York, N.Y.

[21] Appl. No.: 117,128

[22] Filed: Nov. 4, 1987

[30] Foreign Application Priority Data

Nov. 7, 1986 [NL] Netherlands ............... 8602820

[51] Int. Cl.$^4$ .................. H04N 5/78; G11B 21/10; G11B 5/027
[52] U.S. Cl. .................. 360/10.2; 360/77.13; 360/84
[58] Field of Search ............ 360/10.2, 70, 75–77, 360/84–85

[56] References Cited

U.S. PATENT DOCUMENTS 4,703,370 10/1987 Inoue ..................... 360/10.2

*Primary Examiner*—A. J. Heinz
*Attorney, Agent, or Firm*—F. Brice Faller

[57] ABSTRACT

Rotatable head support (6) carries at least one magnetic head (7) which scans the tracks of a magnetic tape (1) guided across an arcuate guide surface (5) over an angle smaller than 180°. The angle of inclination ($\alpha$) of a head relative to a reference plane (100) is adjustable by a rack (13) and a pinion (15) to enable the tracks (26) to be followed at tape speeds (n·$V_0$) which vary relative to a nominal tape speed ($V_0$). Tape speed detection means (22) derive a control signal used to adjust the angle of inclination ($\alpha$) in conformity with a formula containing the playback factor (n) and other parameters in order to enable a comparatively high tape speed (n·$V_0$) to be used, starting from a specific maximum acceptable tracking error.

6 Claims, 2 Drawing Sheets

MAGNETIC-TAPE APPARATUS, HAVING MEANS FOR OPTIMIZING TAPE SPEED

BACKGROUND OF THE INVENTION

The invention relates to a magnetic-tape apparatus having an arcuate guide surface over which a magnetic tape is guided along a helical path over a specific circumferential angle $\phi_0$ in order to read signals from inclined parallel tracks on the tape by means of a rotating magnetic head. Transport means move the magnetic tape over the guide surface with a nominal speed $V_0$ and with variable speeds $n \cdot V_0$, the magnetic head describing a rotary path parallel to a reference plane during operation at the nominal speed $V_0$. Detection means derive a control signal whose magnitude depends on the speed $n \cdot V_0$ of the magnetic tape relative to the guide surface. Adjustment means adjust the inclination of the rotary path of the magnetic head relative to the reference plane depending on the magnitude of the control signal, in order to scan the tracks by means of the magnetic head.

Such a magnetic-tape apparatus is known from U.S. Pat. No. 3,375,331. In this apparatus the head support is mounted on a pivotable drive shaft, the adjustment means adjusting the tilting angle of the drive shaft and hence the inclination $\alpha$ of the rotary path of the magnetic head relative to the reference plane depending on the magnitude of the control signal from the detection means, which depends on the speed of the tape over the guide surface. This tilting ensures that the head follows the track in an optimum manner in the case of tape speeds which deviate from the nominal speed at which the head has written the track on the tape. Without this tilting there will be a different inclination between the path of the head over the tape and the longitudinal axis of the track in the case of a deviating tape speed, as a result of which only a limited portion of the track can be read. Thus, tilting enables, for example, a passage on the tape to the located rapidly by tape transport at a comparatively high speed. As as result of the tilt of the drive shaft the head follows a sinusoidal path on the tape, i.e. the head performs a sinusoidal excursion in height relative to the reference plane. In principle a linear excursion in height is required to follow the inclined track and the sinusoidal path therefore gives rise to tracking errors during the head excursion. In the known apparatus, which dates back to a period in which comparatively large track widths of approximately 200 $\mu$m were used, the sinusoidal approach for the track is acceptable because the maximum tracking errors for the sinusoidal path are comparatively small relative to such track widths, so that the head can follow the track over the entire length at a specific higher tape speed.

However, in recent years magnetic heads and magnetic tapes have been improved considerably and the use of digital-signal recording technology now enables tracks having a width of less than 10 $\mu$m to be written and/or read. In the case of such comparatively narrow tracks tilting of the drive shaft is likely to give rise to such tracking errors that the head does not follow the track over the entire length, so that only a limited portion of the track can be read. In digital-signal recording systems such as the recently developed R-DAT (Rotrary Digital Audio Tape recorder), but also in the digital video recording systems now being developed, this may result in a correct reading of the digital data being impaired.

U.S. Pat. No. 3,375,331 discloses apparatus constructed as a video recorder. The tape is wrapped around the drum-shapedguide surface over a comparatively large circumferential angle greater than 180°, the track length being equal to half the drum circumference. The analog-signal recording technology used implies that each track should contain one picture field to enable the pictures to be reproduced. It is almost impossible to utilize a circumferential angle smaller than 180°, because with such a circumferential angle the track length is inadequate for one picture field. Thus, the known apparatus does not allow the maximum tracking errors occurring as a result of tilting of the drive shaft to be reduced by a reduction of the circumferential angle.

SUMMARY OF THE INVENTION

It is the object of the invention to achieve optimum scanning of comparatively narrow tracks with a tape speed which is as high as possible in comparison with the nominal tape speed.

To this end the magnetic tape is wrapped around the guide surface over a circumferential angle $\phi_0$ smaller than 180°, and the adjustment means are constructed to adjust the angle of inclination $\alpha$ of the rotary head path at least substantially in conformity with the formula:

$$\alpha = \frac{(n-1) \cdot W}{c \cdot \phi_0 \cdot R \cdot p}$$

where:
W = track pitch
R = radius of the guide surface
c = 2 R/k·L, where L = track length and k = number of heads
n = the playback factor determined by the ratio between the instantaneous speed ($n \cdot V_0$) and the nominal speed ($V_0$) of the tape over the guide surface
p = a factor which depends on the number of times x that during scanning of a track by the magnetic head the same absolute value of the maximum tracking error $\epsilon_{max}$ occurs where p = 1 if x = 2 and $$p = \frac{\cos\phi_0}{4} \text{ if } x = 4.$$

This formula for the angle of inclination $\alpha$ defines an optimum relationship between the inclination of rotary path of the magnetic head relative to the reference plane and the playback factor, and hence the increased tape speed, for which angle of inclination the adjustment means maintain the absolute value of the maximum tracking error $\epsilon_{max}$ within the permissible limits during scanning of the track so as to ensure that even comparatively narrow tracks can be read. The circumferential angle $\phi_0$ should then be smaller than 180° in order to ensure that even for comparatively narrow tracks the playback factor n has a sufficiently high value. For the situation x = 2 the angle of inclination $\alpha$ is suitably selected to be equal $\alpha_0$ = the inclination of the rotary path of the head relative to the reference plane in the imaginary situation at an increased tape speed in which the head would be capable of following the track over the entire length, i.e. to be equal to $\alpha O/P$ for the situation X = 4.

In a preferred embodiment of the invention the maximum applicable value of the playback factor n for a specific maximum tracking error $\epsilon_{max}$ is defined by the formula:

$$n = 1 + \frac{2C \cdot \Delta}{1 - \frac{1}{p} \operatorname{sinc} \frac{\phi_0}{2}}$$

where: the relative tracking error is $\Delta = \epsilon_{max}/W$ $$\operatorname{sinc} \frac{\phi_0}{2} = \frac{\sin \phi_0/2}{\phi_0/2}.$$

Assuming that specific parameters for an appratus are fixed, it is then important that the playback factor n and hence the maximum applicable tape speed for a specific maximum permissible relative error $\Delta$ depends exclusively on the circumferential angle $\phi_0$.

In another preferred embodiment of the invention the maximum applicable value of the playback factor n for a specific maximum azimuth loss occurring as a result of the setting of the angle of inclination is defined by the formula:

$$n = 1 + \frac{b \cdot c \cdot L \cdot p}{2W \cdot W_b}$$

where:
$W_b$ = track width
b = bit length.

Consequently the magnitude of the playback factor with regard to the azimuth loss depends on a number of factors, an important factor being that n is inversely proportional to the product of the track pitch and the track width, i.e. that n has a suitable value in the case of comparatively narrow tracks and a small track pitch. A favourable maximum applicable playback factor can be obtained if the circumferential angle $\phi_0$ lies between 60° and 100°. Moreover, such circumferential angles enable an advantageous mechanical configuration for the drum-shaped guide member and the tape guides to be achieved.

A preferred embodiment of the invention is characterized in that a maximum tracking error $\epsilon_{max}$ of the same absolute value occurs four times during scanning of the track by the magnetic head. Such a path of the magnetic head enables a particularly suitable maximum applicable tape speed to be obtained.

A preferred embodiment of a magnetic-tape apparatus in accordance with the invention, in which the drum-shaped guide member comprises stationary upper and lower drums between which a gap is formed in which the head support is rotatably characterized in that the minimum axial distance between the upper drum and the lower drum is greater than:

$$2 \times \frac{(n \cdot 1)W}{C \cdot \phi_0 \cdot P}$$

With such a gap height the tilt of the drive shaft of the head support can be optimised without the risk of damage to the head. Preferably, the gap height is minimised in order to obtain an optimum guidance of the tape over the guide surface, which is divided into two parts by the gap. This is of particular importance in the case of a guide surface defined by a stationary drum system.

DETAILED DESCRIPTION OF THE INVENTION

Figure 1:
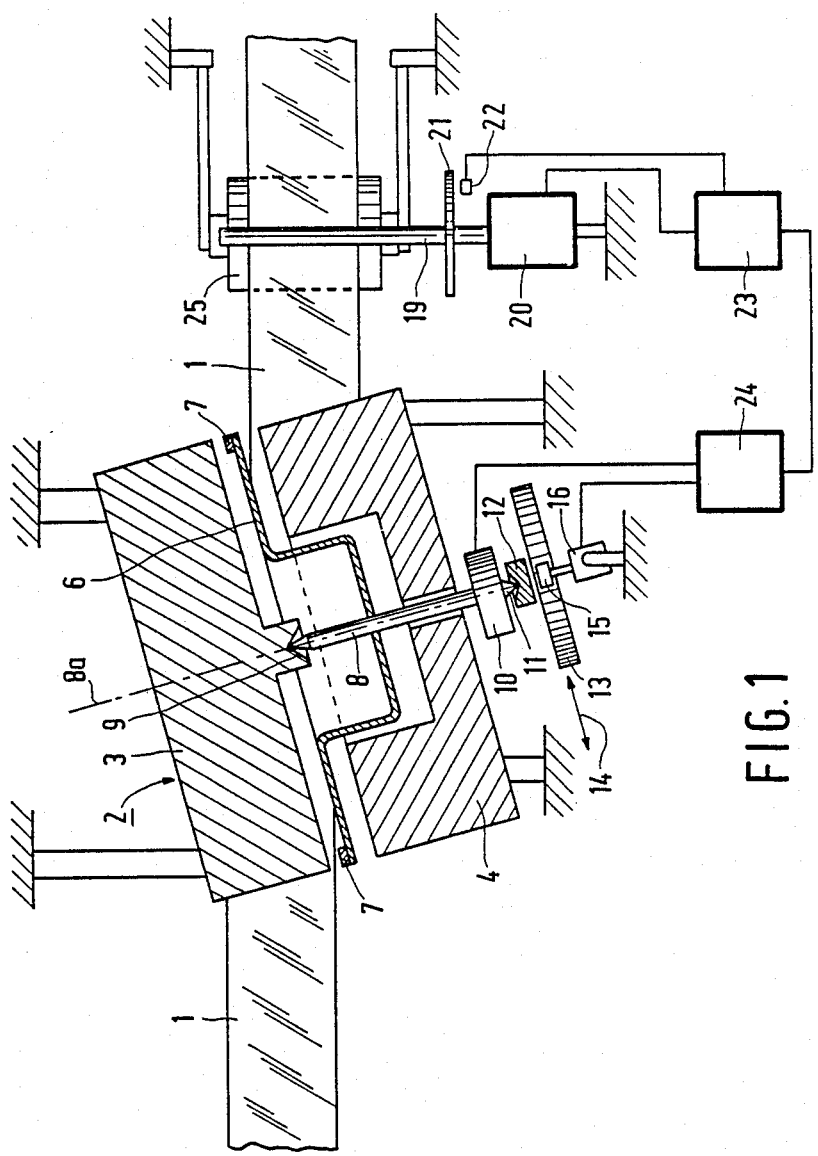
FIG. 1 show diagrammatically those parts of a magnetic-tape apparatus which are relevant to the present invention.
Figure 2:
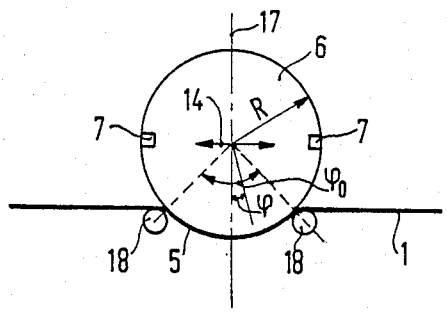
FIG. 2 is a diagrammatic plan view of the head support of the apparatus with a guide surface around which a magnetic tape is wrapped.

FIGS. 1 and 2 show some parts of a magnetic tape apparatus in accordance with the invention which cooperate with a magnetic tape 1. One of these parts is a scanning unit 2 comprising an upper drum 3 which is stationary relative to a frame, not shown, and a lower drum 4 which is also stationary, which drums together constitute a drum-shaped guide member having a guide surface 5 for guiding the tape 1. Between the upper drum and the lower drum a gap is formed in which a head support 6 can rotate. The support 6 carries magnetic heads 7. The present embodiment comprises two diametrally opposed heads 7, but alternatively different numbers of heads may be used. The support 6 is mounted on a drive shaft 8 whose lower end is connected to a motor 10. The upper end of the shaft 8 is tapered and is supported in a conical bearing across 9 in the upper drum 2.

Projecting downwardly from the motor 10 in line with the shaft 8 is a tapered projection 11 which is supported in a conical recess in a bearing 12. The bearing 12 is mounted on a toothed rack 13 which is rectilinearly movable as indicated by a double arrow 14 and, in a manner not shown, is guided in the frame, not shown. A pinion 15 meshes with the toothed rack 13 and is driven by a motor 16 which is secured to the frame. The method of supporting the shaft 8 in conical bearing recesses enables the shaft 8 and with it the support 6 carrying the heads 7 to be tilted by movement of the rack 13 when the motor 16 is energised, the tilting axis 7 being determined by the free upper end of the shaft 8. Suitably, the tilting axis 17 is disposed in the same plane as the free ends of the heads 7.

Figure 3:
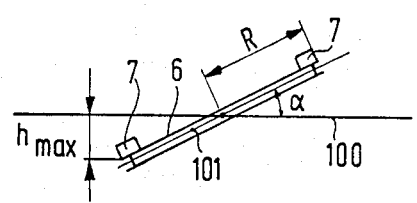
FIG. 3 is a diagrammatic side view of the head support.

The magnetic tape 1 is guided by guides 18 which are arranged upstream and downstream of the guide surface 5 relative to the direction of movement of the tape, the tape 1 being wrapped around the surface 5 in a helical path as a result of the inclination of the axis of rotation 8a of the drive shaft 8 and the vertically offset arrangement of the tape-guide portions which guide the tape edges. In the present embodiment the circumferential angle $\phi_0$ over which the tape is wrapped around the surface 5 is 90°, but other angles smaller than 180°, such as 60°, are also possible. For a more comprehensive description of an apparatus of the aforementioned R-DAT type with a circumferential tape wrapping angle of 90° reference is made to the Applicant's Netherlands Patent Application No. 8501027 filed on Apr. 9, 1985, to which allowed U.S. application Ser. No. 793,887 corresponds. As is stated in said patent application a circumferential angle smaller than 180° has the advantage that the tape guides 18 can be positioned accurately relative to the drums 3 and 4 in a simple manner. On account of the helical path of the tape 1 over the guide surface 5 the local tape transport direction makes an acute angle with the direction of movement of the head at any scanning position of the head scanning the tape during rotation of the heads 7. FIG. 3 shows diagrammatically a reference plane 100 which extends parallel to the rotary head path described by the heads 7 during scanning with a nominal tape speed $V_0$. A further plane 101 is indicated which extends parallel to the rotary head path at another, higher tape speed $n \cdot V_0$. Tilting of the guide shaft 8 enables the angle of inclination $\alpha$ between the planes 100 and 101 to be adjusted.

The motor 16 and the pinion 15 form parts of adjustment means which are constructed to adjust the angle of inclination depending on the speed of the tape 1 relative to the guide surface.

After leaving the guide surface 5 the magnetic tape passes to a capstan 19 (FIG. 1) which is driven at a variable speed by a motor 20. The capstan carries a tacho disc 21 which cooperates with a tachometer pick-up 22 which is connected to a control unit 23. The speed information provided by the tacho-disc 21 is transferred from the tachometer pick-up 22 to a control unit 24 to whcih the motors 10 and 16 are connected.

The capstan 19 cooperates with a pivotable pressure roller 25, the pressure roller 25, the motor 20 and the capstan 19 constituting transport means for the transport of the tape 1 over the guide surface 5.

Figure 4:
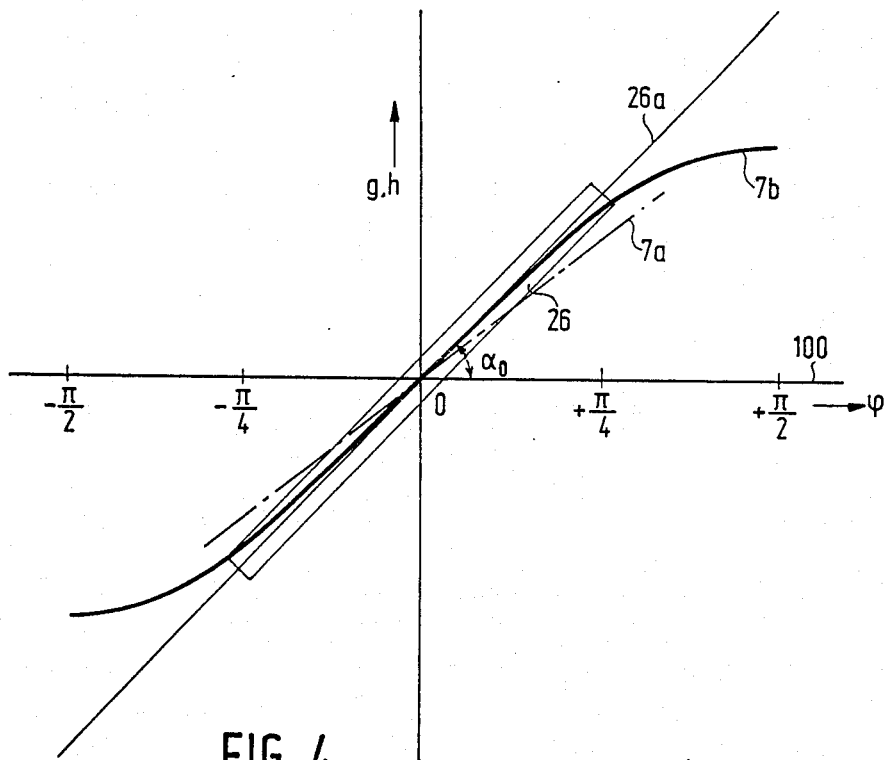
FIG. 4 shows the path described on the tape by a magnetic head in relation to the longitudinal axis of a track to be scanned in an embodiment of the apparatus in which the same absolute value of the maximum tracking error occurs twice during scanning and FIG. 5, in the same way as FIG. 4, shows a path for whch the same absolute value of the maximum tracking error occurs four times during scanning.

The tape 1 carries audio and/or video signals which are recorded in parallel tracks which are inclined at an acute angle to the longitudinal axis of the tape. It is to be noted that the rotary head path during recording of the tracks extends parallel to the reference plane 100, the angle of inclination $\alpha = 0$. In FIG. 4 such a track 26 is represented in a graph, said angle $\alpha_0$ being the angle between the longitudinal axis 26a of the track and the reference plane 100. If during scanning the tape speed is increased to an instantaneous tape speed $nV_0$, for example for rapidly locating a specific passage on the tape, a difference in inclination will arise between the path of the heads over the tape and the longitudinal axis 26a if the angle of inclination $\alpha_0$ of the path of the heads is not modified. In principle, the correct azimuth angle of the heads is maintained, but on account of the deviating path of the heads, indicated by the reference numeral 7a in FIG. 4, only a limited portion of the track 26 can be scanned.

The magnetic-tape apparatus in accordanc with the invention is of the type in which signals are recoreded in digitally encoded form in tracks on the tape in the same way as in he above-mentioned R-DAT type. For said high-speed tape transport scanning of a limited porton of the track 26 may result in, for example, the portion of the track in which the timing code is recorded not being scanned, so that the digital data cannot be read. In the apparatus in accordance with the invention this is solved by slightly tilting the drive shaft 8 in the manner already stated in the event of an increased tape speed, the motor 16 moving the toothed rack 13 out of the mid position shown in FIG. 1, i.e. the position of the shaft 8 corresponding to a nominal tape speed $V_0$. The magnitude of the displacement and hence the angle of inclination is controlled by the control unit 24, receives tape-speed information in the form of control signals from the detection means constituted by the tachometer pickup 22. As a result of this inclination the path of the heads over the tape will become as indicated by the reference numeral 7b in FIG. 4 and the reference numeral 7c in FIG. 5, i.e. instead of the original linear excursion the heads perform a sinusoidal excursion in height relative to the reference plane 100. Suitably, this height excursion is selected so as to be symmetrical relative to the intersection between the reference plane 100 and half the track length. In accordance with one aspect of the invention there are two possibilities for the sinusoidal path of the magnetic heads, i.e. a first possibility as illustrated in FIG. 4 in which the same absolute value of the maximum excursion of the path relative to the longitudinal axis 26a occurs twice and a second possibility illustrated in FIG. 5 in which said absolute value occurs four times.

In order to obtain an optimum angle of inclination in the case of an increased instantaneous tape speed $n \cdot V_0$ with an acceptable absolute value of the maximum tracking error $\epsilon_{max}$, to ensure that each track can be read, one aspect of the invention requires that $\alpha$ for both possibilities mentioned above at least substantially complies with the formula:

$$h = \frac{R \cdot \tan\alpha \cdot \sin\phi}{\sqrt{1 + \tan^2\alpha \cdot \sin^2}}$$

For deriving the angle of inclination $\alpha$ and other parameters reference is made to the following considerations.

Further, it is to be noted that with this method of adjusting the angle of inclination $\alpha$ it is also possible to obtain an effective compensation for inclination errors of the longitudinal axes of the track as a result of, for example, stretch of the tape at a nominal tape speed $V_0$.

General considerations

Figure 5:
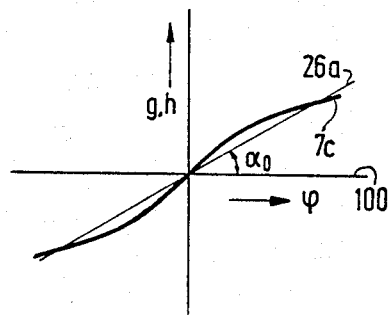

For the height excursion h of the heads 7 relative to the reference plane 100 in the case of an angle of inclination $\alpha$ it is found that for a drum-shaped guide surface:

Here:
- $W$ = track pitch
- $R$ = radius of the guide surface 5
- $c = \frac{2\pi R}{k \cdot L}$ where $L$ = track length and $k$ = number of heads
- $n$ = ratio between instantaneous: nominal tape speed (playback factor)
- $p$ = a factor having the value $p = 1$ for the first-mentioned possibility and
- $p = \frac{\cos\phi}{4}$ for the second possibility of the sinusoidal path of the magnetic heads.

where
$R$ = the radius of the guide surface 5
$\phi$ = circumferential angel of the head reckoned relative to the centre of the circumfernetial angle $\phi_0$ (see FIG. 2)
h follows the line 7b in FIG. 4 and the line 7c in FIG. 5.

For a small angle of inclination $\alpha$ the following approximation is valid:

$$h = \alpha \cdot r \cdot \sin \phi$$

The maximum azimuth error as a result of tilting occurs for $\phi=0$ and is equal to $\alpha$.

$h_{max}$ complies with:

$$h_{max} = R \cdot \sin \alpha$$

For a small $\alpha$ the following approximation is valid $$h_{max} = R \cdot \alpha$$

The desired height position g of the head with respect to the nominal position which the head should have to remain on a track (g follows the line 26a in FIG. 4 and in FIG. 5) is:

$$g = \frac{(n-1)W}{c} \cdot \frac{\phi}{\phi_0}$$

where
$c = 2\pi R / k \cdot L$
where
n = playback factor = ratio between the nominal speed $V_0$ and the instantaneous speed $n \cdot V_0$
W = track pitch
L = track length
k = number of head locations, which are equidistantly spaced over the drum circumference.

Most recording systems comply with c=1 but for the R-DAT system c=2. This deviating value of c=2 for R-DAT is obtained because in this system for $\phi_0 = 90°$ and a total number of two heads there is always some time between the instant at which during scanning the head 1 reaches the end of a track and the head 2 begins to scan another track.

Desired inclination $$\alpha_0 \approx \frac{(n-1) \cdot W}{c \cdot 1}$$

($\alpha_0$ = inclination of the longitudinal axis 26a of the track)

Moreover: $L = \phi_0 \cdot R$ so that $$\alpha_0 \approx \frac{(n-1) \cdot W}{c \cdot \phi_0 \cdot R}$$

consequently, the desired height position g of the head is also given by:

$$g = \alpha_0 \cdot R$$

Possibly 1, for which the same absolute value of the maximum tracking error occurs twice (FIG. 4). Since it is assumed that the path of the head is as shown in FIG. 4, $\alpha = \alpha_0$, so that $\alpha = \dfrac{(n-1) \cdot W}{c, \phi_0 \cdot R}$ and
$h = \alpha_0 \cdot R \cdot \sin \phi$
$g = \alpha_0 \cdot R \cdot \phi$
The tracking error is $\epsilon = g - h = \alpha_0 \cdot R \cdot (\phi - \sin \phi)$
$\epsilon$ is a maximal for $\phi_m = \pm \phi_0 / 2$
Consequently, $$\epsilon_m = \alpha_0 R \left( \frac{\phi_0}{2} - \sin \frac{\phi_0}{2} \right)$$

Assume that the permissable $\epsilon_m = \Delta \cdot W$ i.e. the maximum tracking error is a fraction of the track pitch, then the following relationships are valid:

$$\alpha_0 R \left( \frac{\phi_0}{2} - \sin \frac{\phi_0}{2} \right) = \Delta \cdot W$$

$$\frac{(n-1) \cdot W}{c \cdot \phi_0} \left( \frac{\phi_0}{2} - \sin \frac{\phi_0}{2} \right) = \Delta \cdot W$$

$$(n-1) \left( 1 - \frac{2}{\phi_0} \cdot \sin \frac{\phi_0}{2} \right) = 2c\Delta$$

When $\sin \phi / \phi$ n defined as sinc $\phi$ thus:

$$\sin c \frac{\phi_0}{2} = \frac{\sin \frac{\phi_0}{2}}{\frac{\phi_0}{2}}$$

this yields $$(n-1)\left(1 - \sin c \frac{\phi_0}{2}\right) = 2c$$

or $n = 1 + \dfrac{2c\Delta}{1 - \sin c \dfrac{\phi_0}{2}}$

Thus, this formula gives the max. permissible n for the selected $\epsilon_m$.

It is then desirable that n is an integer; the next lower integer is chosen. In conventional azimuth recording n is generally also required to be a multiple of two, unless additional heads are employed.

| $\phi_0$ | $1 - \sin c \dfrac{\phi_0}{2}$ | n |
|---|---|---|
| $\pi$ (180°) | 5.5 | $1 + 5.5\,c\Delta$ |
| $2/3\,\pi$ (120°) | 11.6 | $1 + 11.6\,c\Delta$ |
| $1/2\,\pi$ (90°) | 20.0 | $1 + 20.0\,c\Delta$ |
| $1/3\,\pi$ (60°) | 44.4 | $1 + 44.4\,c\Delta$ |

This table enables the maximum playback factor n for a specific $\phi_0$ to be derived if c and $\Delta$ are known. It is to be noted that n increases substantially for circumferential angels $\phi_0$ below 180°, in particular for angles of 90° and smaller.

By means of the foregoing it is also possible to determine the value of the maximum tracking error $\epsilon_m$ for a specific $\phi_0$ and n via $\epsilon_m = \Delta \cdot W$.

Further, $h_{max}$ complies with the following:

$$h_{max} = R \cdot \alpha = R\alpha_0$$

or $$h_{max} = \frac{(n-1) \cdot W}{c \cdot \phi_0}$$

For the height of the gap between the stationary upper drum 3 and lower drum 3 allowance must be made for $2 \cdot h_{max}$.

Possibility 2, where the same absolute value of the maximum tracking error occurs four times (FIG. 5)

This tracking error occurs at the beginning and at the end of the track and twice between the ends.

Now the following applies:

$$h = R \cdot \alpha \cdot \sin \phi$$

$$g = R \cdot \alpha_0 \cdot \phi$$

$$\epsilon = g - h = R(\alpha_0 \cdot \phi - \phi \sin \phi)$$

$$\frac{d\epsilon}{d\phi} = R(\alpha_0 - \alpha \cdot \cos\phi) = 0$$

or $\alpha \cdot \cos \phi_m = \alpha_0$ $$\cos \phi_m = \frac{\alpha_0}{\alpha}$$

$$\sin \phi_m = \sqrt{1 - \left(\frac{\alpha_0}{\alpha}\right)^2}$$

$$\phi_m = \arccos\left(\frac{\alpha_0}{\alpha}\right)$$

The maximum tracking error between the ends occurs for $+\phi_m$ and $-\phi_m$ and is given by:

$$\epsilon_m = R\left\{\alpha_0 \arccos\left(\frac{\alpha_0}{\alpha}\right) - \alpha\sqrt{1 - \left(\frac{\alpha_0}{\alpha}\right)^2}\right\}$$

or $\epsilon_m = R\alpha\left\{\left(\frac{\alpha_0}{\alpha}\right)\arccos\left(\frac{\alpha_0}{\alpha}\right) - \sqrt{1 - \left(\frac{\alpha_0}{\alpha}\right)^2}\right\}$ The error at the end of the track is given by:

$$\epsilon = R\left\{\alpha_0 \cdot \frac{\phi_0}{2} - \alpha \sin\frac{\phi_0}{2}\right\}$$

or $\epsilon = R\alpha\left\{\left(\frac{\alpha_0}{\alpha}\right)\left(\frac{\phi_0}{2}\right) - \sin\left(\frac{\phi_0}{2}\right)\right\}$ The error at the end of the track should now be equal to $-\epsilon_m$ so that $$\left(\frac{\alpha_0}{\alpha}\right)\left(\frac{\phi_0}{2}\right) - \sin\left(\frac{\phi_0}{2}\right) = \sqrt{1 - \left(\frac{\alpha_0}{\alpha}\right)^2} -$$

$$\left(\frac{\alpha_0}{\alpha}\right)\arccos\left(\frac{\alpha_0}{\alpha}\right)$$

If $p = \alpha_0/\alpha$ this becomes:

$$p\left(\frac{\phi_0}{2}\right) - \sin\left(\frac{\phi_0}{2}\right) = \sqrt{1 - p^2} - p \arccos p$$

or $p \arccos p - \sqrt{1 - p^2} - \sin\left(\frac{\phi_0}{2}\right) + p\left(\frac{\phi_0}{2}\right) = 0$ From these formulas it is possible to derive p (and consequently $\alpha$) if $\phi_0$ is given.

If $\alpha = \alpha_0/p$ then $\epsilon_m$ is given by:

$$\epsilon_m = \frac{\alpha_0 R}{p}\left\{p\left(\frac{\phi_0}{2}\right) - \sin\left(\frac{\phi_0}{2}\right)\right\}$$

$$\epsilon_m = \frac{(n-1)W}{c \phi_0 p}\left\{p\left(\frac{\phi_0}{2}\right) - \sin\left(\frac{\phi_0}{2}\right)\right\}$$

It is again summed that $\epsilon_m = \Delta W$ so that $(n - 1)\left\{1 - \frac{2}{p\phi_0}\sin\left(\frac{\phi_0}{2}\right)\right\} = 2 c \Delta$ or $(n - 1)\left\{1 - \frac{1}{p}\operatorname{sinc}\left(\frac{\phi_0}{2}\right)\right\} = 2 c \Delta$ hence $n = 1 + \dfrac{2 c \Delta}{1 - \dfrac{1}{p}\operatorname{sinc}\left(\dfrac{\phi_0}{2}\right)}$ for values of $\phi_0$ which are not too large p may be approximated by $p = \cos \phi_0/4$. This applies in particular to $\phi_0 \leq \frac{1}{2}\pi$.

| $\phi_0$ | p | $\cos\frac{\phi_0}{4}$ |
|---|---|---|
| 2/3 π | .870 | .866 |
| 1/2 π | .925 | .924 |
| 1/3 π | .966 | .966 |

Table of the playback factor n for specific values of $\phi_0$:

| $\phi_0$ | $\dfrac{2}{1 - \dfrac{1}{p}\operatorname{sinc}\left(\dfrac{\phi_0}{2}\right)}$ | n |
|---|---|---|
| π | 16.4 | 1 + 16.4 cΔ |
| 2/3 π | 40.5 | 1 + 40.5 cΔ |
| 1/2 π | 74.9 | 1 + 74.9 cΔ |
| 1/3 π | 175 | 1 + 175 cΔ |

A comparison of this table with that for the situation in which the same absolute value of $\epsilon_m$ occurs twice shows that the playback factor n now has a value which is approximately 3 to 4 times as high. It follows that the use of the same absolute value $\epsilon_m$ occurring four times is of great advantage for the value of the playback factor n.

Since $\alpha = \alpha_0/p$ this means that $h_{max}$ now complies with:

$$h_{max} = R\alpha = R\frac{\alpha_0}{p}$$

or $$h_{max} = \frac{(-1)W}{C\phi_0 P}$$

Again allowance is to be made for $2 \cdot h_{max}$ for the height of the gap between the upper drum 3 and the lower drum 4.

Limitation of the playback factor by the azimuth error.

The loss as a result of the azimuth error is given by:

$$\frac{\Phi}{\Phi_0} = \text{sinc}\frac{\pi W_b \cdot \tan\alpha}{\lambda}$$

where
$\lambda$ = wavelength
$W_b$ = track width
$\Phi$ = flux through the head
$\Phi_0$ = flux through the head in the absence of an azimuth error.

Starting from a digital recording system such as R-DAT, it is now assumed that for the maximum azimuth error $\alpha_m$ the first zero point of the sinc function should be situated at least at $2\times$ the bit frequency. This yields:

$$\text{sinc}\frac{\pi \cdot W_b \cdot \tan\alpha_m}{b/2} = 0 \text{ where } b = \text{bit length}$$

$$\text{or } \frac{W_b \cdot \tan\alpha_m}{b/2} = 1$$

$$W_b \tan\alpha_m = b/2$$

$$\tan\alpha_m = \frac{b}{2W_b}$$

$$\alpha_m = \text{arc tan}\frac{b}{2W_b}$$

If $\alpha_m$ is not too large this may be approximated by:

$$\alpha_m = b/2W_b$$

The output loss at the Nyquist frequency (i.e. half the bit frequency) $f_n = f_b/2$ is given by sinc $\pi/4$ this is equal to $$\frac{2\sqrt{2}}{\pi}$$

or $-0.9$ dB.

The output loss at the bit frequency $f_b$ is given by sinc $\pi/2$

This is equal to $2/\pi$ or $-3.9$ dB.

The max azimuth error is equal to the max. angle of inclination $\alpha$. If possibility 1 is chosen, then $$\alpha = \alpha_0 = \frac{(n-1)W}{c\phi_0 R}$$

$$\text{Hence } \frac{b}{2W_b} = \frac{(n-1) \cdot W}{c \cdot \phi_0 \cdot R}$$

-continued $$n = 1 + \frac{b \cdot c \cdot \phi_0 \cdot R}{2W \cdot W_b} = 1 + \frac{b \cdot c \cdot L}{2W \cdot W_b}$$

If possibility 2 is selected then:

$$\alpha = \frac{\alpha_0}{p} = \frac{(n-1)W}{c \cdot \phi_0 \cdot R \cdot p}$$

$$\text{Hence } \frac{b}{2W_b} = \frac{(n-1)W}{c \cdot \phi_0 R \cdot p}$$

$$n = 1 + \frac{b \cdot c \phi_0 R \cdot p}{2W \cdot W_b} = 1 + \frac{b \cdot c \cdot L \cdot p}{2W \cdot W_b}$$

As regards the tracking error the playback factor n for both possibilities only depends on the wrapping angle $\phi_0$ and the permissible maximum tracking error $\epsilon_m$. The value of the playback factor n is then acceptable for $\phi_0 < 180°$ and is optimum for values of $\phi_0$ between 60° and 90°. With respect to the azimuth loss the playback factor n is a linear function of the bit length b and the radius R and, to a some extent, also of $\phi_0$ but is inversely proportional to the product of the track pitch W and the track width $W_b$. Assuming that W and $W_b$ are equal the formulas for the playback factor n contain the term $2 \cdot W^2$ as a result of the azimuth loss. In this respect it is important that in view of the azimuth loss broad tracks (large W and $W_b$) yield an unsatisfactory result for n, whilst systems with narrow tracks (such as R-DAT) yield a favourable result.

It is to be noted that instead of the electro-mechanical detection means (21, 22) described above, detection means may be used which derive the control signal from the information read from the track by the magnetic head. The advantage of such a system is that inaccuracies in the tape transport near the capstan 19, for example as a result of tape stretch, cannot adversely affect the inclination control.

what is claimed is:

1. A magnetic-tape apparatus comprising
   a rotatable head support (6) carrying at least one magnetic head (7),
   a drum-shaped guide member (3, 4) having on its outer circumference near a portion of the path of the magnetic head an arcuate guide surface (5) over which a magnetic tape (1) is guided along a helical path over a specific circumferential angle ($\phi_0$) in order to read signals from inclined parallel tracks (26) on the tape by means of the magnetic head (7),
   transport means (19, 20, 25) constructed to move the magnetic tape over the guide surface (5) with a nominal speed ($V_0$) and with variable speed ($n \cdot V_0$), the magnetic head (7) describing a rotary path parallel to a reference plane (100) during operation at the nominal speed ($V_0$),
   detection means (22) constructed to derive a control signal whose magnitude depends on the speed ($n \cdot V_0$) of the magnetic tape relative to the guide surface (5), and
   adjustment means (15, 16) constructed to adjust the inclination ($\alpha$) of the rotary path of the magnetic head (7) relative to said reference plane (100) depending on the magnitude of said control signal, in order to scan the tracks (26) by means of the magnetic head (7),
   characterized in that the magnetic tape (1) is wrapped around the guide surface (5) over a circumferential angle ($\phi_0$) smaller than 180°, and the adjustment means (15, 16) are constructed to adjust the anlge of inclination ($\alpha$) of the rotary head path at least substantial, in conformity with the formula:

$$\alpha = \frac{(n-1) \cdot W}{c \cdot \phi_0 \cdot R \cdot p}$$

where:
W = track pitch
R = radius of the guide surface
c = $2\pi R/k \cdot L$, where L = track length and k = number of heads
n = the playback factor determined by the ratio between the instantaneous speed ($n \cdot V_0$) and the nominal speed ($V_0$) of the tape over the guide surface
p = a factor which depends on the number of times (x) that during scanning of a track by the magnetic head the same absolute value of the maximum tracking error $\epsilon_{max}$ occurs
where p = 1 if X = 2 and
p = cos $\phi_0/4$ if X = 4.

2. A magnetic-tape apparatus as claimed in claim 1, characterized in that the maximum applicable value of the playback factor (n) for a specific maximum tracking error $\epsilon_{max}$ is defined by the formula:

$$n = 1 + \frac{2 C \cdot \Delta}{1 - \frac{1}{p} \text{sinc} \frac{\phi_0}{2}}$$

where: the relative tracking error is $\Delta = \epsilon max/W$ $$\text{sinc} \frac{\phi_0}{2} = \frac{\sin \phi_{0/2}}{\phi_{0/2}}.$$

3. A magnetic tape apparatus as claimed in claim 1, characterized in that the maximum applicable value of the playback factor (n) for a specific maximum azimuth loss occurring as a result of the setting of the angle of inclination is defined by the formula:

$$n = 1 + \frac{b \cdot c \cdot L \cdot p}{2W \cdot W_b}$$

where:
$w_b$ = track width
b = bit length.

4. A magnetic-tape apparatus as claimed in claim 1, characterized in that the circumferential angle $\phi_0$ lies between 60° and 100°.

5. A magnetic-tape apparatus as claimed in claim 1, characterized in that the same absolute value of the maximum tracking error $\epsilon_{max}$ occurs four times during scanning of a track by the magnetic head (7).

6. A magnetic-tape apparatus as claimed in claim 1, in which the drum-shaped guide member comprises stationary upper and lower drums (3, 4) between which a gap is formed in which the head support (6) is rotatably arranged, characterized in that the minimum axial clearance between the upper drum and the lower drum (3, 4) is larger than:

$$2 \times \frac{(n-1)W}{c \cdot \phi_0 \cdot p}$$

* * * * *